United States Patent
Ha et al.

(10) Patent No.: US 10,457,151 B2
(45) Date of Patent: Oct. 29, 2019

(54) POWER CONVERSION APPARATUS AND METHOD

(71) Applicant: Hyundai Motor Company, Seoul (KR)

(72) Inventors: Tae-Jong Ha, Gyeonggi-Do (KR); Gi-Bong Son, Busan (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 14/795,364

(22) Filed: Jul. 9, 2015

(65) Prior Publication Data

US 2016/0185237 A1 Jun. 30, 2016

(30) Foreign Application Priority Data

Dec. 24, 2014 (KR) ................. 10-2014-0187954

(51) Int. Cl.
*B60L 11/18* (2006.01)
*B60L 1/00* (2006.01)
*B60L 50/51* (2019.01)
*B60L 58/20* (2019.01)

(52) U.S. Cl.
CPC ............ *B60L 11/1803* (2013.01); *B60L 1/00* (2013.01); *B60L 50/51* (2019.02); *B60L 58/20* (2019.02); *B60L 2210/12* (2013.01); *B60L 2210/14* (2013.01); *B60L 2240/526* (2013.01); *B60L 2240/527* (2013.01); *Y02T 10/7005* (2013.01); *Y02T 10/7066* (2013.01); *Y02T 10/7225* (2013.01); *Y02T 10/7233* (2013.01); *Y02T 10/92* (2013.01)

(58) Field of Classification Search
CPC . Y02T 10/7005; Y02T 10/7077; Y02T 10/70; B60W 10/08; B60W 20/00
USPC ........................................................ 318/139
See application file for complete search history.

(56) References Cited

U.S. PATENT DOCUMENTS

| | | | |
|---|---|---|---|
| 5,552,681 A | 9/1996 | Suzuki et al. | |
| 2010/0213904 A1* | 8/2010 | Yamada | B60L 3/003 |
| | | | 320/166 |
| 2011/0127937 A1* | 6/2011 | Takamatsu | H02P 6/08 |
| | | | 318/400.06 |
| 2011/0241636 A1 | 10/2011 | Wu et al. | |

(Continued)

FOREIGN PATENT DOCUMENTS

| | | |
|---|---|---|
| CN | 1121276 A | 4/1996 |
| JP | 2007-246038 | 9/2007 |

(Continued)

OTHER PUBLICATIONS

First Office Action from China National Intellectual Property Administration for Chinese Patent Application No. 201510468892.2, dated Apr. 1, 2019, 13 pages.

*Primary Examiner* — Kawing Chan
*Assistant Examiner* — Bradley R Brown
(74) *Attorney, Agent, or Firm* — Mintz Levin Cohn Ferris Glovsky and Popeo, P.C.; Peter F. Corless (57) ABSTRACT

A power conversion apparatus and method are provided. The apparatus includes a main battery and a power converter configured to execute a high power conversion mode that generates a high power and a low power conversion mode that generates a low power using an input power from the main battery. Additionally, an auxiliary battery is configured to receive and charge the low power and an inverter is configured to convert the high power to a driving power for driving a motor.

14 Claims, 5 Drawing Sheets

(56) References Cited

U.S. PATENT DOCUMENTS

| | | | |
|---|---|---|---|
| 2012/0187919 A1 | 7/2012 | Andersson et al. | |
| 2012/0232737 A1 | 9/2012 | Jeon | |
| 2013/0200846 A1* | 8/2013 | Ang | B60L 11/1816 320/109 |
| 2014/0271272 A1* | 9/2014 | Jeon | H02M 7/06 417/410.1 |

FOREIGN PATENT DOCUMENTS

| | | |
|---|---|---|
| JP | 2009-055687 A | 3/2009 |
| JP | 2011-087444 | 4/2011 |
| JP | 2012-152079 | 8/2012 |
| KR | 10-2012-0064552 | 6/2012 |
| KR | 10-2012-0137153 | 12/2012 |
| KR | 10-1305759 | 9/2013 |

* cited by examiner

POWER CONVERSION APPARATUS AND METHOD

CROSS-REFERENCE TO RELATED APPLICATION

This application claims the benefit of priority to Korean Patent Application No(s). 10-2014-0187954 filed on Dec. 24, 2014, the entire contents of which are incorporated herein by reference.

BACKGROUND

Field of the Invention

The present invention relates to a power conversion apparatus and method, and more particularly, to a power conversion apparatus and method that reduces the size and improves the efficiency in an eco-friendly vehicle.

Description of Related Art

A hybrid vehicle among eco-friendly vehicles refers to a vehicle that uses two power sources. For example, the hybrid vehicle refers to a vehicle that has a motor operated by electricity and an engine operated with gasoline combustion.

Therefore, a general hybrid vehicle includes two or more controllers to operate the two power sources respectively. Accordingly, the vehicle may be composed of two power sources of a motor and an engine although different depending on systems, and may comprise an engine control unit (hereinafter, referred to as ECU) configured to operate an engine, a motor control unit (hereinafter, referred to as MCU) configured to operate a motor, a hybrid control unit (hereinafter, referred to as HCU) configured to select any one of power sources at the top domain of the ECU and the MCU or determine a power distribution rate thereof, a high power converter (e.g., High voltage direct current-direct current (DC/DC) converter) configured to convert a high-voltage battery voltage to a voltage for driving the electric motor of the hybrid vehicle, a battery management system configured to monitor the state of the high-voltage battery, and a low power converter (e.g., Low voltage DC/DC converter) configured to charge an auxiliary battery in the high voltage battery, and so on.

The HCU is configured to execute the power distribution (or selection) between the two power sources, i.e. the motor and the engine based on the state of the vehicle, and is also configured to diagnose current vehicle state. However, the high power converter and the low power converter convert power in the same power source, but hardware and/or controllers should be designed respectively since output targets thereof are different from each other. Furthermore, the low power converter is required to use a transformer since the voltage drop rate thereof is substantial thus increasing the size, weight and cost of the power converter.

SUMMARY

The present invention provides a power conversion apparatus and method capable of reducing the size and improving the efficiency thereof.

The power conversion apparatus may include a main battery, a power converter configured to execute a high power conversion mode that generate a high power and a low power conversion mode that generate a low power using an input power from the main battery, an auxiliary battery configured to receive and charge the low power, and an inverter configured to convert the high power to a driving power to drive a motor. The power converter may include a plurality of conversion modules connected in parallel for executing the high power conversion mode and the low power conversion mode. Further, when the high power conversion mode and the low power conversion mode are executed simultaneously, one of the conversion modules may operate in the low power conversion mode and the other conversion modules may operate in the high power conversion mode. When only the high power conversion mode is executed, the plurality of the conversion modules may all operate in the high power conversion mode.

Additionally, the plurality of the conversion modules may be non-inverting buck-boosts and may be operated in the interleaving manner. The main battery may include a plurality of main batteries and the power converter may be configured to charge the main battery through driving power of the motor based on regenerative braking.

Furthermore, a first switch network that selectively connects the plurality of the main batteries to the plurality of the conversion modules may be further included. A second switch network may be configured to selectively output the high power based on the high power conversion mode and the low power based on the low power conversion mode. The outputs of the plurality of the conversion modules may have command duty for simultaneous execution of the high power conversion mode and the low power conversion mode, and triangle wave output delayed as much as $360°/(1-N)$. In addition, the outputs of the plurality of the conversion modules may have command duty for executing only the high power conversion mode and triangle wave output delayed as much as $360°/N$.

Another exemplary embodiment of the present invention provides a power conversion method that may include executing, by a power converter, a high power conversion mode that generates a high power and a low power conversion mode that generates a low power using an input power from a main battery, charging the low power to an auxiliary battery, and converting the high power to a driving power for driving a motor using an inverter.

The conversion mode execution may include allowing one conversion module among a plurality of conversion modules to be operated in the low power conversion mode and the other conversion modules to be operated in the high power conversion mode when the high power conversion mode and the low power conversion mode are executed simultaneously. Further, the conversion mode execution may include allowing all the plurality of the conversion modes to be operated in the high power conversion mode when only the high power conversion mode is executed.

According to the present invention, the size of the apparatus may be reduced by incorporating a power conversion apparatus separated into a high power converter and a low power converter. Further, other effects of the present invention include converting power more stably since battery series modularity may be embodied. Another effect of the present invention includes reducing current ripple since the bidirectional parallel maneuver and operation of a plurality of power conversion apparatuses may be possible. Furthermore, another effect of the present invention includes contributing to efficiency increase and fuel efficiency improvement of vehicle according to the unification of the power conversion apparatus.

BRIEF DESCRIPTION OF THE DRAWINGS

The above and other objects, features and advantages of the present disclosure will be more apparent from the following detailed description taken in conjunction with the accompanying drawings.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety or boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention may be applied by various modifications and have many exemplary embodiments. Specific exemplary embodiments of the present invention are going to be illustrated to the drawings and explained concretely in the detailed description. However, this is not intended to limit the present invention to the specific exemplary embodiments. It should be understood to comprise all the various equivalent, changeable examples and substitutes included within the thought and scope of the technology of the present invention.

In explaining each drawing, similar reference numbers may be used to similar elements. The terms of the first, the second and so on may be used to explain various elements, but the elements should not be limited by the terms. The terms are used only for the purpose of distinguishing one element from the other elements. For example, the first element may be named to the second element without departing from the claim scope of the present invention, and similarly, the second element may be named to the first element. The term of "and/or" is a combination of a plurality of associated and described articles or includes any one article of a plurality of associated and described articles.

Unless otherwise defined, all terms used herein, scientific terms and technical terms have the same meaning as commonly understood by a person who has a typical knowledge in a technology field to which the present invention belongs to. Terms such as defined in the dictionary generally used should be interpreted as meaning that corresponds to meaning in the context of the relevant art, and unless clearly defined in the present application, they should not be interpreted as idealistic or excessively formalistic meaning.

Hereinafter, a power conversion apparatus and method according to an exemplary embodiment of the present invention will be described in detail with reference to the accompanying drawings.

Figure 1:
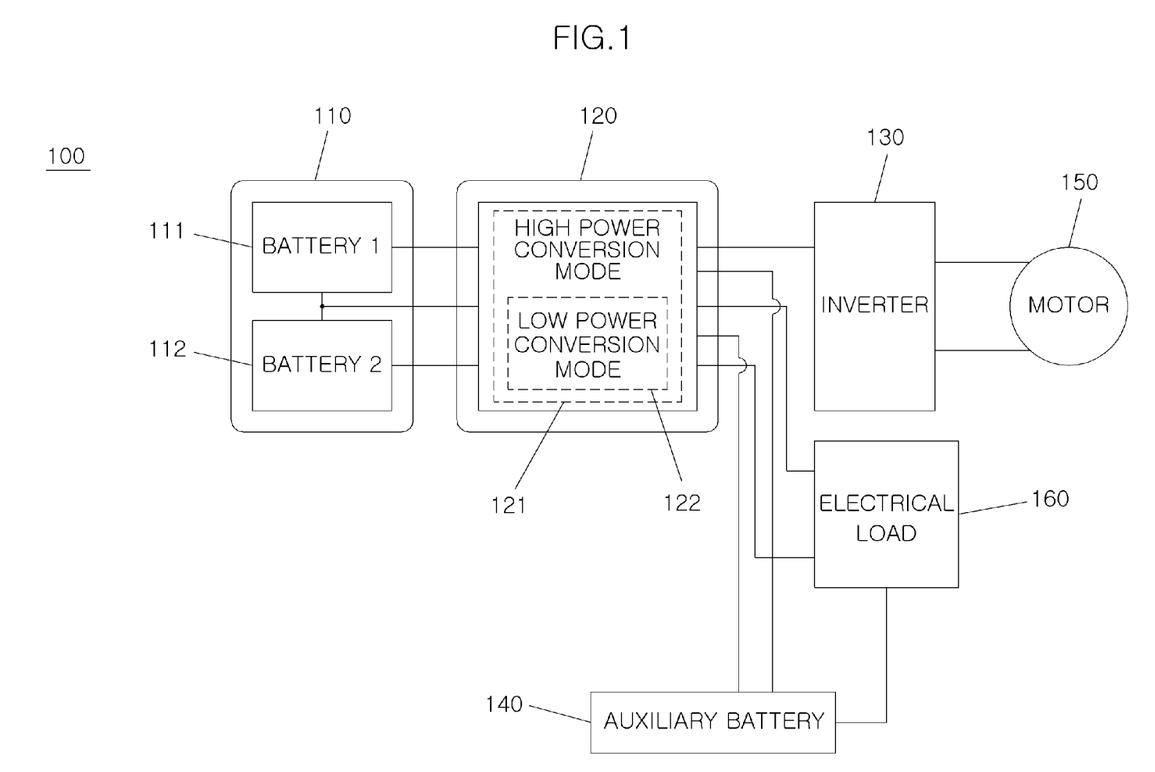
FIG. 1 is a block diagram of a power conversion apparatus according to an exemplary embodiment of the present invention.

FIG. 1 is a block diagram of a power conversion apparatus 100 according to an exemplary embodiment of the present invention. Referring to FIG. 1, the power conversion apparatus 100 may include a main battery 110, a power converter 120 configured to execute a high power conversion mode that generates a high power and/or a low power conversion mode that generates a low power using an input power from the main battery 110, an auxiliary battery 140 configured to receive and charge the low power, an inverter 130 configured to convert the high power to a driving power to drive a motor 150, and the motor 150 configured to receive the driving power to be operated. The low power is power source less than 100V, and the high power is power source more than or equal to 100V.

Further, electrical load 160 such as lamps, wipers and a door locker, etc. is provided to both the inside and exterior of a vehicle. The main battery 110 may include a plurality of battery cells (not shown) disposed in series and/or in parallel. The battery cells may be a high voltage battery for the vehicle such as a nickel metal battery, a lithium-ion battery, a lithium polymer battery, and an all-solid battery, etc. In general, the high voltage battery refers to a high voltage battery of about 100V or greater used as a power source to drive electric vehicles, but it is not limited hereto and a low voltage battery may be also available. The main battery 110 may include a plurality of main batteries, for example, a first main battery 111 and a second main battery 112 as shown in FIG. 1 for ease of understanding.

In the exemplary embodiment of the present invention, a hybrid vehicle will be described as an example of an electric vehicle, but it is not limited hereto. A plug-in hybrid electric vehicle (PHEV), an electric vehicle (EV), a neighborhood electric vehicle (NEV) and a fuel-cell vehicle (FCV), etc. may also be applied.

The power converter 120 may be integrated into the configurations of a high power conversion mode 121 and a low power conversion mode 122. The power converter 120 may be configured to execute simultaneous driving operation of executing the high power conversion mode and the low power conversion mode at the same time, or single driving operation of executing only the high power conversion mode based on the command of a controller such as a hybrid control unit (HCU), etc. The inverter 130 may be configured to convert the high power generated by the power converter 120 into a driving power to drive the motor 150 and supply the driving power to the motor 150. Of course, the inverter 130 may also be configured to provide a charging power caused by the reverse rotation of the motor 150 to the main battery 110 and/or the auxiliary battery 140.

The motor 150 may be an alternating current (AC) motor, a Brushless Direct Current (BLDG) motor, etc. and may be connected to a transmission (not shown) to convert electric energy into mechanical energy. Additionally, the motor 150 may be configured to operate as a generator through regenerative braking control algorithm to produce a power. This power may be converted at the power converter 120 using the inverter 130 to charge the main battery 110. In other words, the power converter 120 may have bi-directional characteristics for the bight power conversion mode 121, to produce a driving force for the motor 150 as well as charging the main battery 110 with the driving force of the motor 150.

Figure 2:
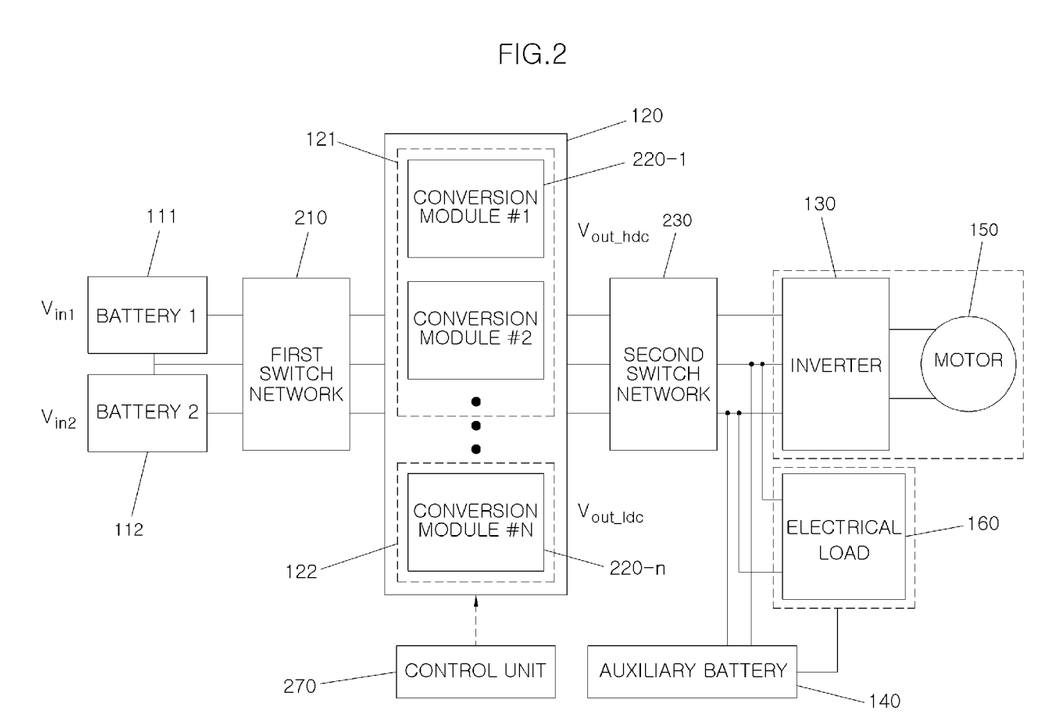
FIG. 2 is a block diagram of simultaneous execution of a high power conversion mode and a low power conversion mode in accordance with the power conversion apparatus shown in FIG. 1 according to an exemplary embodiment of the present invention.

FIG. 2 is a detailed block diagram of the case that the high power conversion mode and the low power conversion mode are executed simultaneously in accordance with the power conversion apparatus 100 shown in FIG. 1. Referring to FIG. 2, the power converter 120 may include a first to N-th conversion modules 220-1 to 220-n connected in parallel to each other for executing the high power conversion mode and/or the low power conversion mode.

Therefore, when the high power conversion mode 121 and the low power conversion mode 122 (FIG. 1) are executed simultaneously, the N-th conversion module 200-n among the first to N-th conversion modules 220-1 to 220-n may be configured to operate in the low power conversion mode 122 and the other conversion modules 220-1 to 220-n-1 may be configured to operate in the high power conversion mode 121.

A first switch network 210 may be connected to the left end of the power converter 120 and may electrically connect the first main battery 111 and the second main battery 112 selectively to the first to N-th conversion modules 220-1 to 220-n. Further, a second switch network 230 may connected to the right end of the power converter 120 and may be configured to output the high power and/or the low power based on the high power conversion mode and/or the low power conversion mode simultaneously and supply the power to the inverter 130, the auxiliary battery 140, and the electrical load 160. In particular, the second switch network 230 may be configured to supply the high power to the inverter 130, and the low power to the auxiliary battery 140, and the electrical load 160.

The first and second switch networks 210, 230 may mainly use a power relay, but they are not limited hereto, and semiconductor switching elements such as FET (Field Effect Transistor), MOSFET (Metal Oxide Semiconductor FET), IGBT (Insulator Gate Bipolar Mode Transistor) and power rectifier diodes and the like, thyristor, GTO (Gate Turn-Off), TRIAC, SCR (Silicon Controlled Rectifier) and IC (Integrated Circuit) and the like may be used. In particular, in the case of semiconductor elements, bipolar, power MOSFET (Metal Oxide Silicon Field Effect Transistor) element and the like may be used. Since the power MOSFET element is operated by a high voltage and a high current, it may have the structure of DMOS (Double-Diffused Metal Oxide Semiconductor) unlike general MOSFET.

Furthermore, the first to N-th conversion modules 220-1 to 220-n may include non-inverting Buck-Boosts and may be connected in parallel to each other and operated in the interleaving manner. When the power converter 120 supplies power to the electrical load 160 and charges the auxiliary battery 140, the high power conversion mode and the low power conversion mode may be operated simultaneously. Input-output relational formula of the N-th conversion module 220-n used as the low power converter is as follows.

$$V_{out\_ldc} = V_{in1} * (D/D') \qquad \text{Equation 1}$$

wherein, D and D' represent duty values, $V_{out\_ldc}$ represents output voltage of a low power converter (ex, LDC), $V_{in1}$ represents output voltage of the low power converter. The other conversion modules 220-1 to 220-n-1 except for the N-th conversion module 220-n used as the low power converter may be operated in the high power converter, connected in parallel to each other and operated in the interleaving manner. The triangle wave, which outputs the duty compared to a command duty from a controller 270 in each of the other conversion modules 220-1 to 220-n-1, may be set to be delayed as much as 360°/(N−1). Hence, the controller 270 may be a hybrid control unit (HCU), but it is not limited hereto.

In addition, Input-output relational formula of the conversion modules 220-1 to 220-n used as the high power converter is as follows.

$$V_{out\_hdc} = V_{in2} * (D/D') \qquad \text{Equation 2}$$

wherein, $V_{out\_hdc}$ represents output voltage of a high power converter (ex, HDC), $V_{in2}$ represents output voltage of the high power converter.

Figure 3:
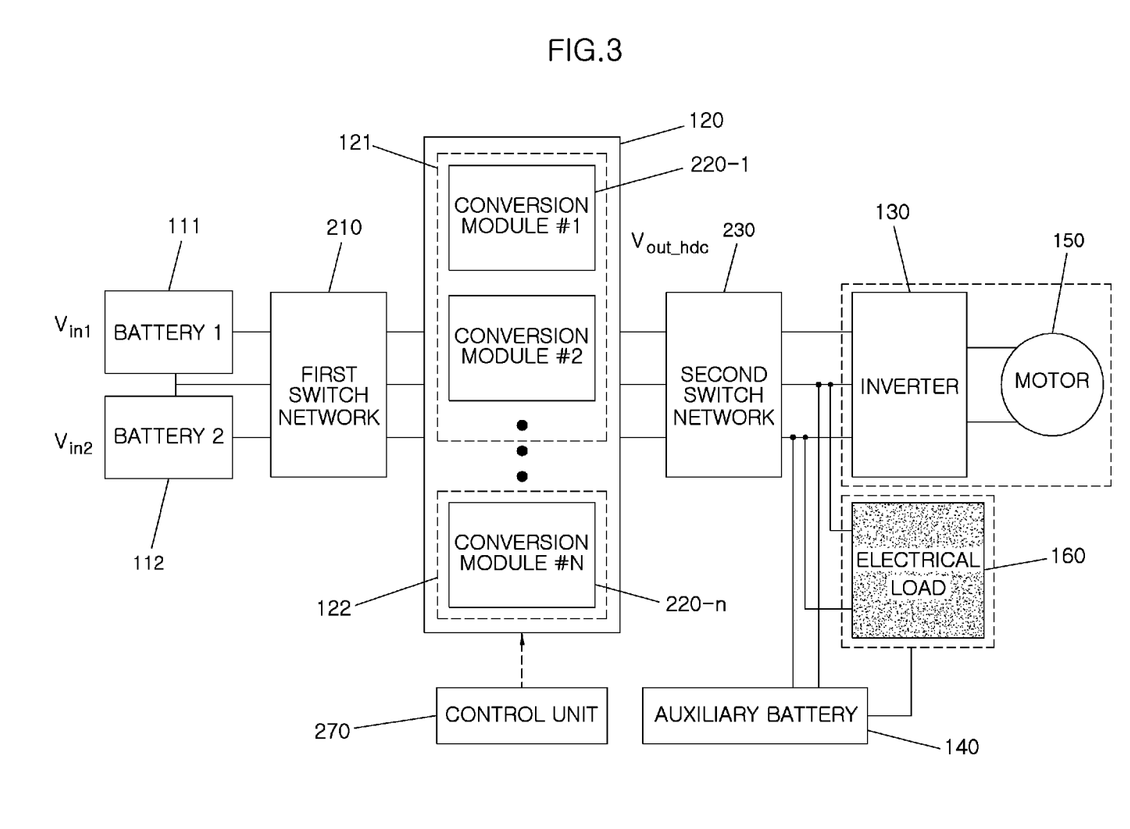
FIG. 3 is a block diagram when only the high power conversion mode is executed in accordance with the power conversion apparatus shown in FIG. 1 according to an exemplary embodiment of the present invention.

FIG. 3 is a detailed block diagram of when the high power conversion mode is executed in accordance with the power conversion apparatus shown in FIG. 1. Referring to FIG. 3, when only the high power conversion mode is executed, the first to N-th conversion modules 220-1 to 220-n may be operated in the high power conversion mode.

When the power converter 120 does not supply power to the electrical load 160 and the energy saved in the auxiliary battery 140 is supplied to the electrical load 160, the low power converting function may be omitted and the high power converting function may be operated alone. Accordingly, the first to N-th conversion modules 220-1 to 220-n may be operated only in the high power converter unlike the simultaneous driving operation as shown in FIG. 2, connected in parallel to each other and operated in the interleaving manner.

The triangle wave, which outputs the duty compared to a command duty from a control unit 270 in each of the conversion modules 220-1 to 220-n−1, may be set to be delayed as much as 360°/N. In particular, input-output relational formula of the first to N-th conversion modules 220-1 to 220-n is as follows.

$$V_{out\_hdc} = (V_{in1} + V_{in2}) * (D/D') \quad \text{Equation 3}$$

Figure 4:
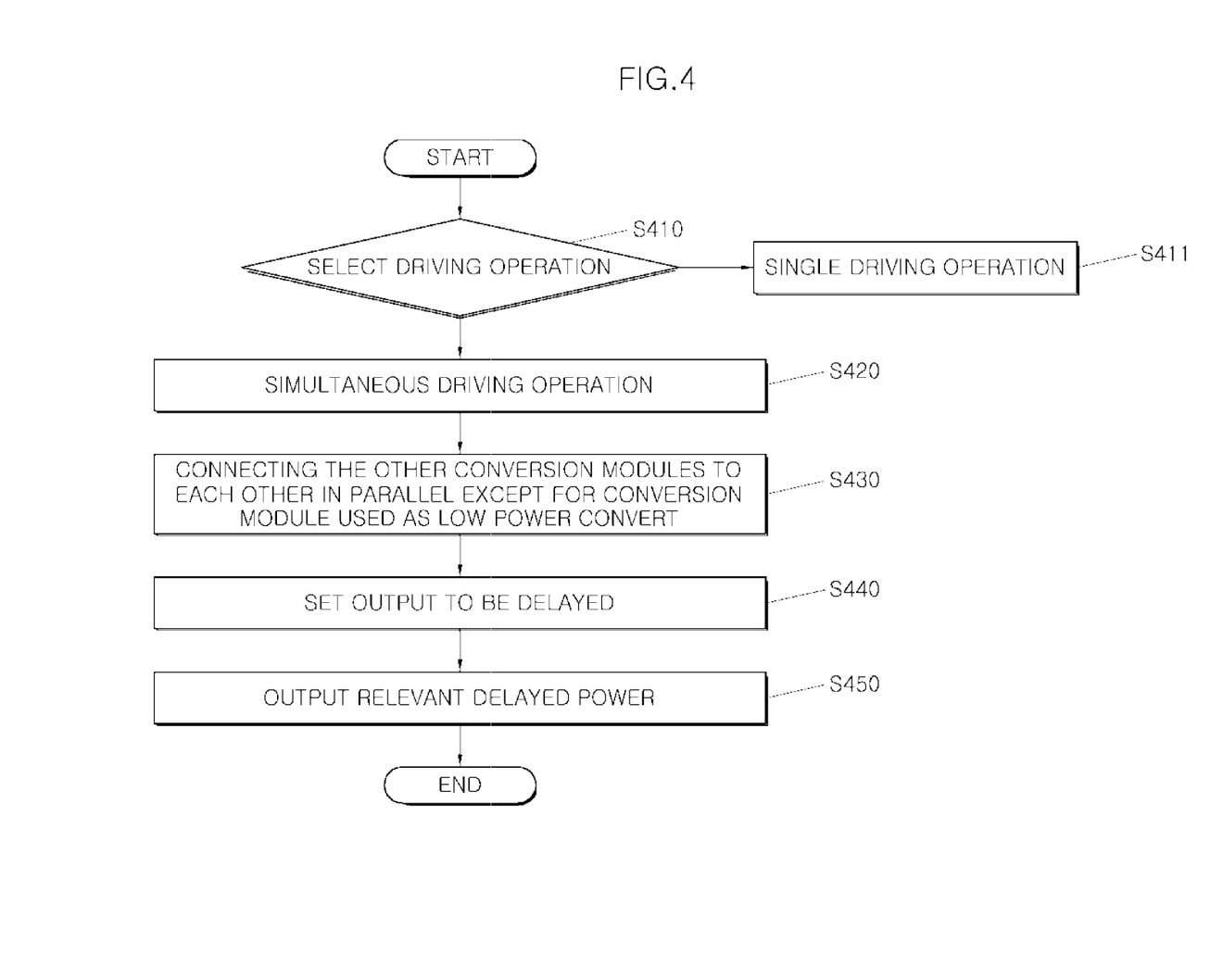
FIG. 4 is a flow chart showing the process in which the high power conversion mode and the low power conversion mode are executed simultaneously according to FIG. 2 according to an exemplary embodiment of the present invention.

FIG. 4 is a flow chart showing the process in which the high power conversion mode and the low power conversion mode are executed simultaneously. The process described in FIG. 4 may be executed by a controller. Referring to FIG. 4, the controller 270 may be configured to select either the simultaneous driving operation in which the high power conversion mode and the low power conversion mode are executed at the same time or the single driving operation in which only the high power conversion mode is executed (step S410).

In the step 410, when the simultaneous driving operation is selected, the N-th conversion module 220-n among the first to N-th conversion modules 220-1 to 220-n of the power converter 120 may be operated in the low power conversion mode, and the other conversion modules 220-1 to 220-n−1 may be connected in parallel to each other to be operated in the high power conversion mode (step S420, S430). Thereafter, the other conversion modules 220-1 to 220-n−1 may be set to have the command duty for the simultaneous execution of the high power conversion mode and the low power conversion mode and the triangle wave output delayed as much as 360°/(1−N), and output the delayed power (step S440, S450).

Figure 5:
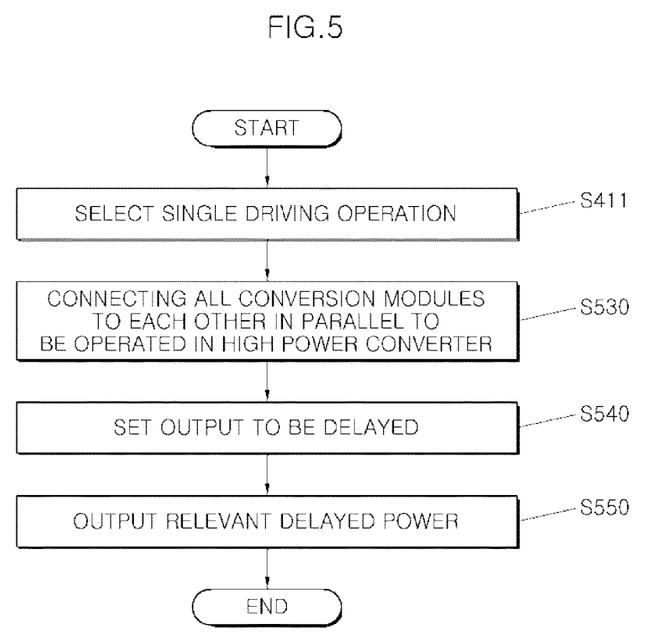
FIG. 5 is a flow chart showing the process in which only the high power conversion mode is executed according to FIG. 3 according to an exemplary embodiment of the present invention.

FIG. 5 is a flow chart showing the process that only the high power conversion mode is executed at the same time according to FIG. 3. The process described in FIG. 5 may be executed by a controller. Referring to FIG. 5, when the single driving operation is selected in the step S410, the first to N-th conversion modules 220-1 to 220-n may be connected H parallel to each other to operate the high power conversion mode (step S411, S530). Thereafter, the modules 220-1 to 220-n may be set to have the command duty for the simultaneous execution of the high power conversion mode and the low power conversion mode and the triangle wave output delayed as much as 360°/(N), and output the delayed power (step S540, S550).

What is claimed is:

1. A power conversion apparatus, comprising:
   a main battery;
   a power converter having a plurality of conversion modules connected in parallel to each other for executing a high power conversion mode that generates a high power and a low power conversion mode that generates a low power using an input power from the main battery;
   an auxiliary battery configured to receive and charge the low power; and
   an inverter configured to convert the high power to a driving power to drive a motor,
   wherein one conversion module among the plurality of the conversion modules operates in the low power conversion mode and the other conversion modules operate in the high power conversion mode, when the high power conversion mode and the low power conversion mode are executed simultaneously,
   wherein all of the plurality of conversion modules operate in the high power conversion mode when only the high power conversion mode is executed,
   wherein the main battery includes a plurality of main batteries connected in series,
   wherein the power converter is a bi-directional converter in the high power conversion mode,
   wherein the high power conversion mode is executed with the lower power conversion mode simultaneously or alone,
   wherein the low power conversion mode is executed when an electrical load is used, and
   wherein the plurality of conversion modules all have the same function.

2. The power conversion apparatus of claim 1, wherein the plurality of the conversion modules are non-inverting buck-boosts.

3. The power conversion apparatus of claim 1, wherein the plurality of the conversion modules are operated in the interleaving manner.

4. The power conversion apparatus of claim 1, wherein the power converter is configured to charge the main battery using the driving power of the motor based on regenerative braking.

5. The power conversion apparatus of claim 1, further comprising:
   a first switch network that selectively connects the plurality of the main batteries to the plurality of the conversion modules.

6. The power conversion apparatus of claim 1, further comprising:
   a second switch network configured to selectively output the high power based on the high power conversion mode and the low power based on the low power conversion mode.

7. The power conversion apparatus of claim 1, wherein the outputs of the plurality of the conversion modules have command duty for simultaneous execution of the high power conversion mode and the low power conversion mode, and triangle wave output delayed as much as 360°/(1−N), wherein N is the number of conversion modules.

8. The power conversion apparatus of claim 1, wherein the outputs of the plurality of the conversion modules have command duty for executing the high power conversion mode and triangle wave output delayed as much as 360°/N, wherein N is the number of conversion modules.

9. A power conversion method, comprising:
   executing, by a power converter, a high power conversion mode that generates a high power and a low power conversion mode that generates a low power using an input power from a main battery, wherein the power converter includes a plurality of conversion modules connected in parallel to each other for executing the high power conversion mode and the lower power conversion mode;
   charging, by a controller, the low power to an auxiliary battery; and
   converting, by the controller, the high power to a driving power for driving a motor using an inverter,
   wherein the conversion mode execution includes:

operating, by the controller, one conversion module among a plurality of conversion modules in the low power conversion mode and operating the other conversion modules in the high power conversion mode when the high power conversion mode and the lower power conversion mode are executed simultaneously, wherein all of the plurality of conversion modules are operated in the high power conversion mode when only the high power conversion mode is executed, wherein the main battery includes a plurality of main batteries connected in series, wherein the power converter is a bi-directional converter in the high power conversion mode, wherein the high power conversion mode is executed with the lower power conversion mode simultaneously or alone, wherein the low power conversion mode is executed when an electrical load is used, and wherein the plurality of conversion modules all have the same function.

10. The power conversion method of claim 9, wherein the plurality of the conversion modules are non-inverting buck-boosts.

11. The power conversion method of claim 9, wherein the plurality of the conversion modules are operating in the interleaving manner.

12. The power conversion method of claim 9, wherein the power converter is configured to charge the main battery using the driving power of the motor based on regenerative braking.

13. The power conversion method of claim 9, wherein the outputs of the plurality of the conversion modules have command duty for simultaneous execution of the high power conversion mode and the low power conversion mode, and triangle wave output delayed as much as $360°/(1-N)$, wherein N is the number of conversion modules.

14. The power conversion method of claim 9, wherein the outputs of the plurality of the conversion modules have command duty for executing only the high power conversion mode and triangle wave output delayed as much as $360°/N$, wherein N is the number of conversion modules.

* * * * *